US009252930B2

(12) United States Patent
Qu et al.

(10) Patent No.: US 9,252,930 B2
(45) Date of Patent: Feb. 2, 2016

(54) REFERENCE SIGNAL TRANSMISSION AND RECEPTION METHOD AND EQUIPMENT

(75) Inventors: Bingyu Qu, Rolling Meadows, IL (US);
Weimin Xiao, Hoffman Estates, IL (US);
Brian Classon, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 54 days.

(21) Appl. No.: 13/344,305

(22) Filed: Jan. 5, 2012

(65) Prior Publication Data

US 2012/0176939 A1 Jul. 12, 2012

Related U.S. Application Data

(60) Provisional application No. 61/442,013, filed on Feb. 11, 2011, provisional application No. 61/430,857, filed on Jan. 7, 2011.

(51) Int. Cl.
*H04L 12/28* (2006.01)
*H04L 5/00* (2006.01)
*H04L 27/26* (2006.01)

(52) U.S. Cl.
CPC ............ *H04L 5/0023* (2013.01); *H04L 5/0048* (2013.01); *H04L 5/0057* (2013.01); *H04L 27/2613* (2013.01)

(58) Field of Classification Search
None
See application file for complete search history.

(56) References Cited

U.S. PATENT DOCUMENTS

2010/0182976 A1* 7/2010 Ko et al. .................... 370/330
2010/0273506 A1* 10/2010 Stern-Berkowitz ... G01S 5/0009 455/456.1
2010/0284394 A1* 11/2010 Takata ................ H04J 13/0003 370/343
2011/0034175 A1* 2/2011 Fong ...................... H04B 7/024 455/450
2011/0103343 A1 5/2011 Nishio et al.
2011/0170562 A1* 7/2011 Hu ......................... H04L 5/0023 370/479
2011/0176581 A1* 7/2011 Thomas ............... H04B 1/7075 375/146
2011/0199986 A1* 8/2011 Fong ..................... H04L 5/0035 370/329
2011/0235607 A1 9/2011 Haustein et al.

(Continued)

FOREIGN PATENT DOCUMENTS

WO WO 2009/157168 A1 12/2009
WO WO 2010/063317 A1 6/2010
WO WO 2010/106729 A1 9/2010

OTHER PUBLICATIONS

International Search Report, Huawei Technologies Co., Ltd., International Application No. PCT/CN2012/070123, Date of mailing: Apr. 12, 2012, 6 pages.

(Continued)

*Primary Examiner* — Kwang B Yao
*Assistant Examiner* — Hardikkumar Patel
(74) *Attorney, Agent, or Firm* — Slater & Matsil, LLP

(57) ABSTRACT

A communications system and a method for performing communications are provided. User Equipments (UEs) are provided with UE-specific configuration information, such as CSI-RS (Channel Status Indication-Reference Signal) patterns, antenna port groupings, reference signal configurations, subframe configurations, and/or scrambling codes. The UEs process the received reference signals in accordance with the received configuration information and feedback measurement information for, e.g., PMI/CQI/RI (Precoding Matrix Indicator/Channel Quality Indicator/Rank Indicator of the precoding matrix) and/or the RLM/RRM (Radio Link Monitor/Radio Resource Management).

29 Claims, 9 Drawing Sheets

(56) References Cited

U.S. PATENT DOCUMENTS

2011/0317581 A1  12/2011  Hoshino et al.
2012/0093012 A1* 4/2012  Pedersen .............. H04W 24/10
                                                    370/252

OTHER PUBLICATIONS

Written Opinion of International Searching Authority, Huawei Technologies Co., Ltd., International Application No. PCT/CN2012/070123, Date of mailing: Apr. 12, 2012, 4 pages.
3rd Generation Partnership Project; Technical Specification Group Radio Access Network; Evolved Universal Terrestrial Radio Access (E-UTRA); Physical layer procedures (Release 10), 3GPP TS 36.213, V10.0.1, Dec. 2010, 98 pages, Section 7.2.3-7.2.5.
3rd Generation Partnership Project; Technical Specification Group Radio Access Network; Evolved Universal Terrestrial Radio Access (E-UTRA); Physical channels and modulation (Release 10), 3GPP TS 36.211, V10.0.0, Dec. 2010, 50 pages, Section 6.10.5.
3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331, V10.0.0, Dec. 2010, 276 pages (specific pp. 157-158).
3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331, V10.1.0, Mar. 2011, 290 pages (specific pp. 164-165).
"Extended Eurpean Search Report," Application No. 12732351.7, Applicant: Huawei Technologies Co., Ltd., mailing date: Nov. 18, 2013, 9 pages.
Ericsson, et al., "Physical layer parameters to be configued by RRC," 3GPP TSG-RAN WG2 #72, Agenda Item: 7.1.3.2, Tdoc R2-106465, Nov. 15-19, 2010, pp. 1-8.
New Postcom, "Remaining details in CSI-RS signaling and PDSCH muting design," 3GPP TSG RAN WG1 Meeting #63, R1-105938, Agenda Item: 631, Nov. 15-19, 2010, 10 pages.
Huawei, et al., "Remaining details on CSI RS," 3GPP TSG RAN WG1 meeting #63, R1-105840, Agenda Item: 6.3.1, Nov. 15-19, 2010, 12 pages.

* cited by examiner

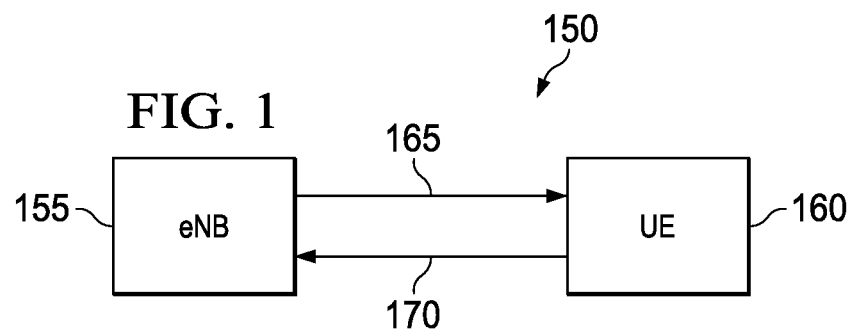
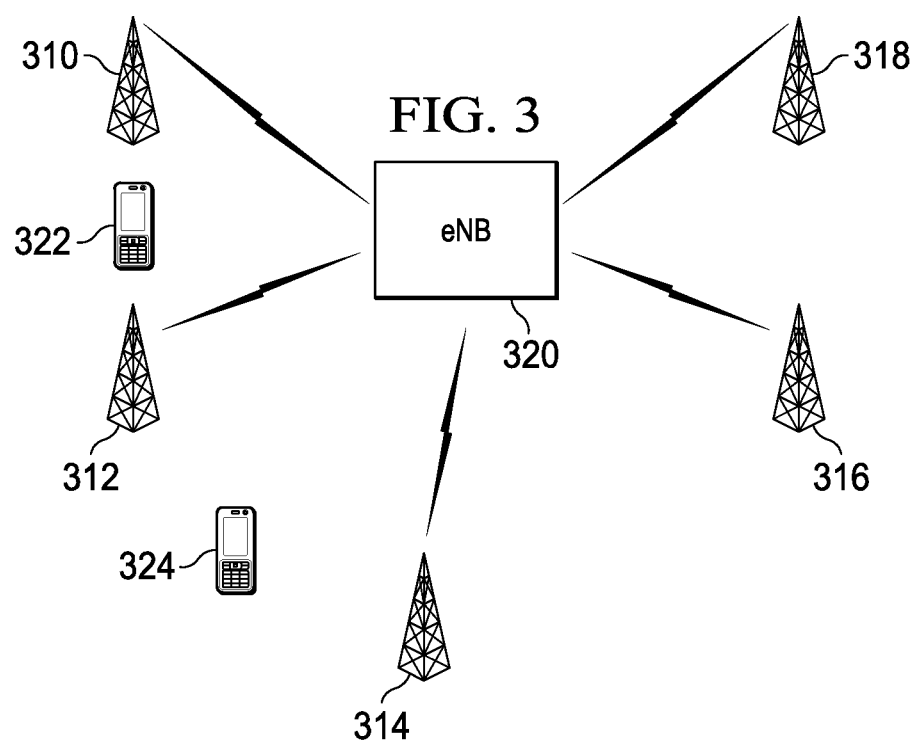

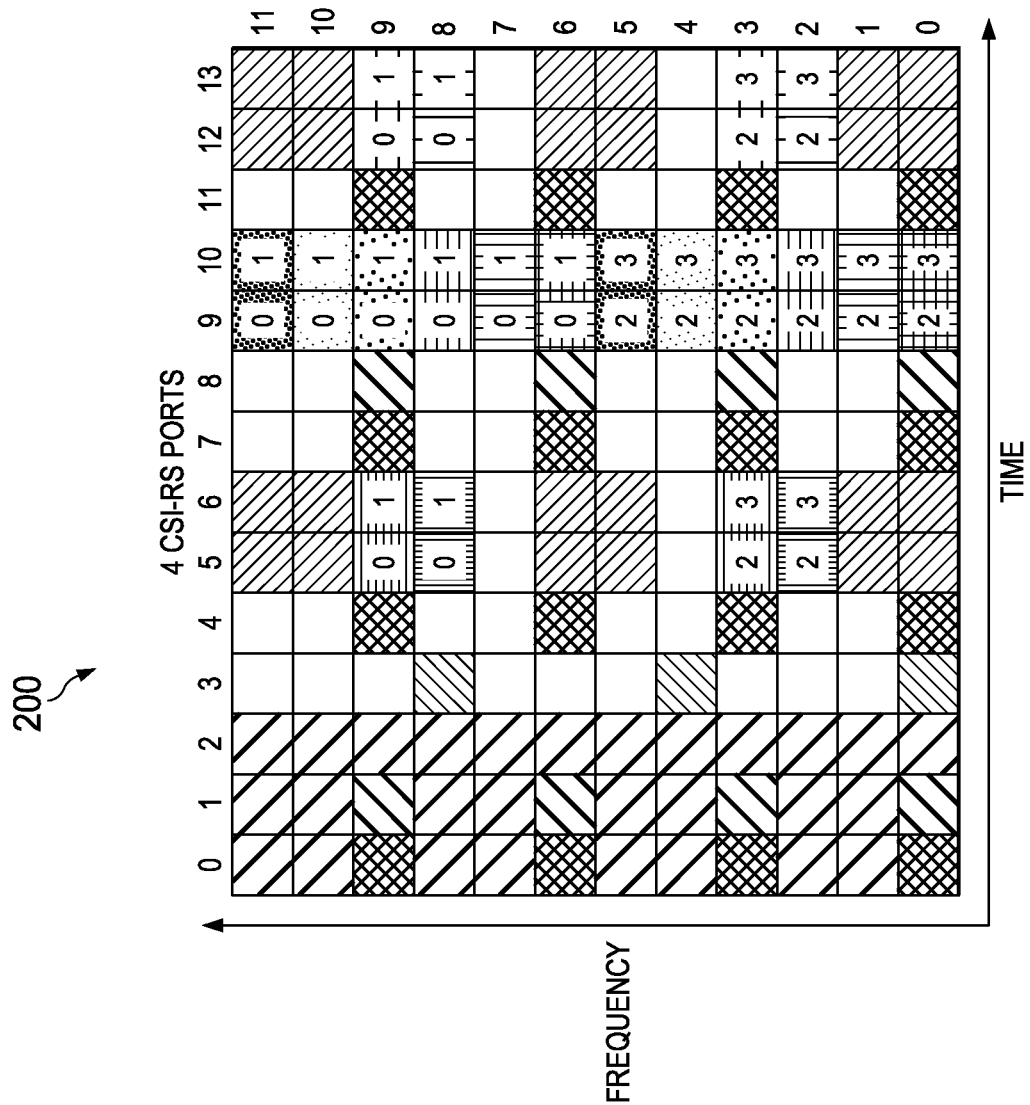
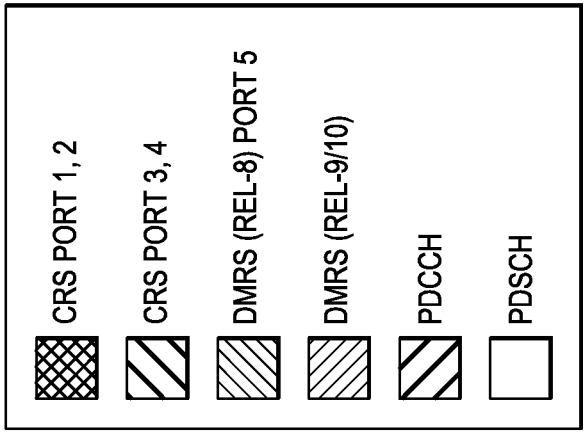
FIG. 2a

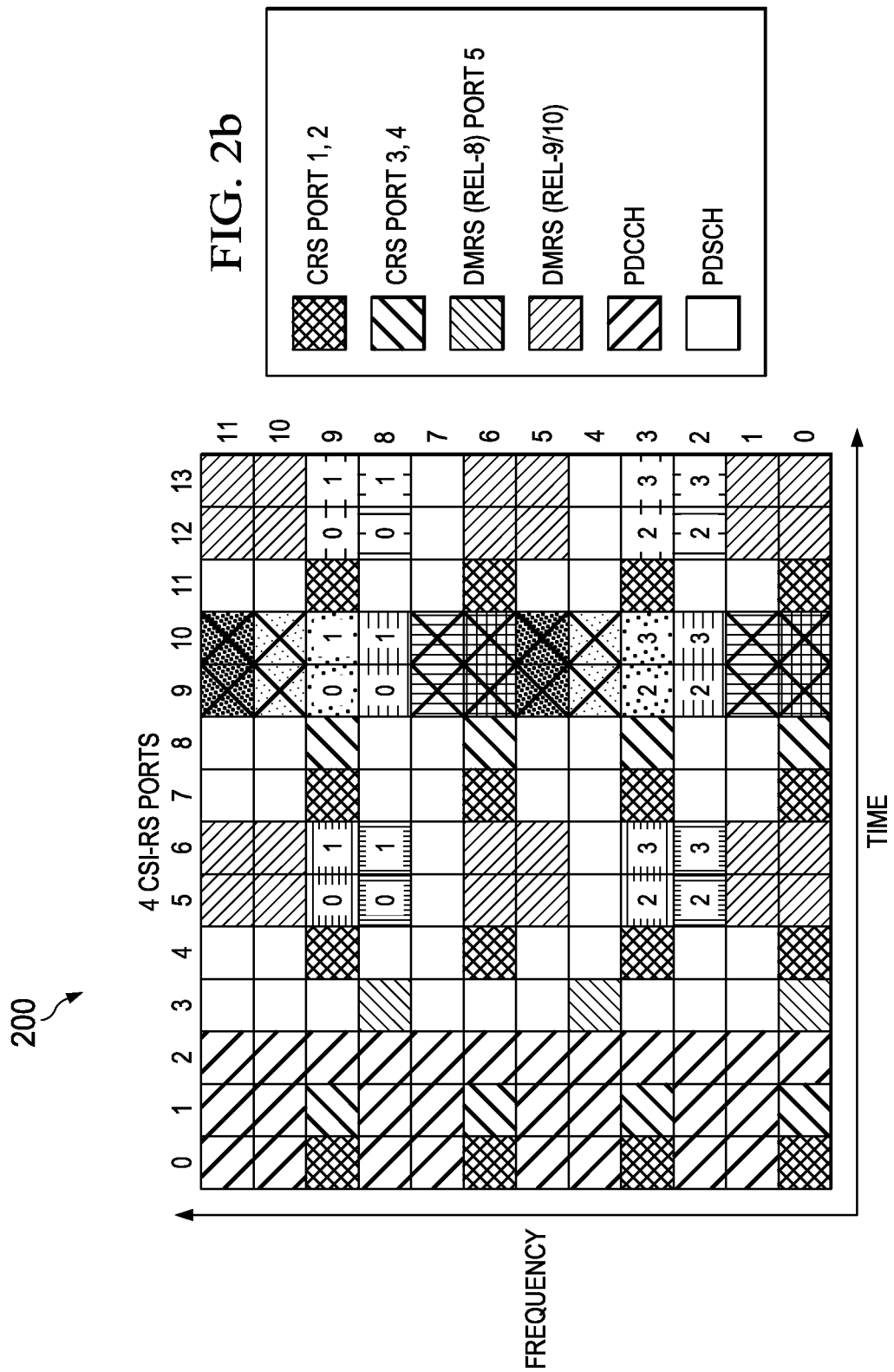

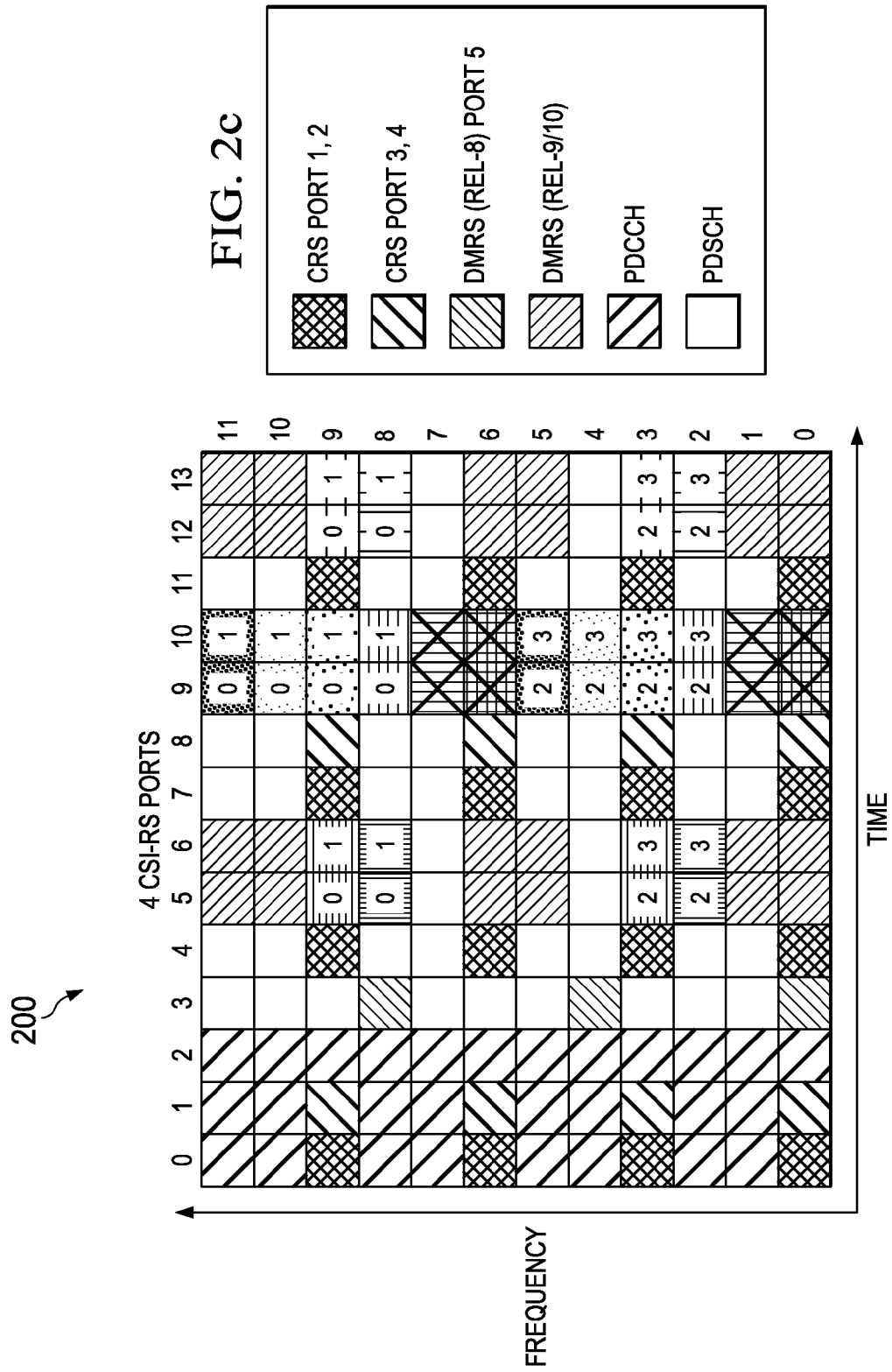

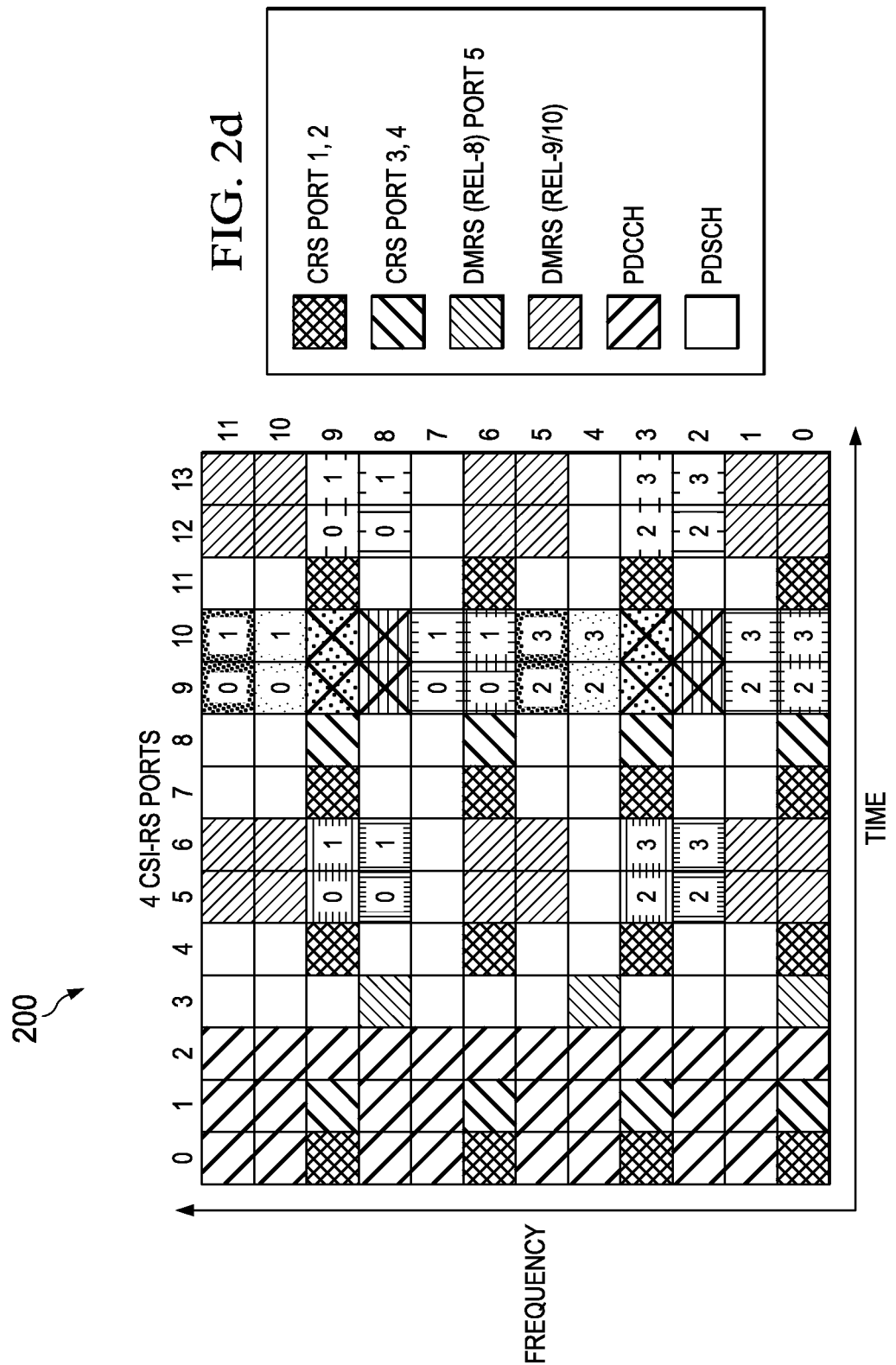

REFERENCE SIGNAL TRANSMISSION AND RECEPTION METHOD AND EQUIPMENT

This application claims the benefit of U.S. Provisional Application No. 61/430,857, filed on Jan. 7, 2011, entitled "Reference Signal Transmission and Reception Method and Equipment," and U.S. Provisional Application No. 61/442,013, filed on Feb. 11, 2011, entitled "Signaling and Method of Reference Signal Transmission and Reception," which applications are hereby incorporated herein by reference.

TECHNICAL FIELD

The present invention relates generally to digital communications, and more particularly to a system and method for signaling reference signals, or measuring channel state information using reference signals in a communications system.

BACKGROUND

In downlink transmission in wireless communications systems, such as an LTE-A system, there is reference signal for UE (user equipment) to perform channel estimation for demodulation of PDCCH (Physical downlink control channel) and other common channels as well as for measurement and some feedbacks, which is Common/Cell-specific Reference Signal (CRS) inherited from the Rel-8/9 specification of E-UTRA (Evolved Universal Terrestrial Radio Access). Dedicated/De-modulation reference signal (DMRS) can be transmitted together with the PDSCH (Physical downlink shared channel) channel in Rel-10 (Release-10) of E-UTRA. DMRS is used for channel estimation during PDSCH demodulation.

In Rel-10, CSI-RS (Channel Status Indication Reference Signal or Channel State Information Reference Signal) is introduced in addition to CRS (common reference signal) and DMRS (dedicated demodulation reference signal). CSI-RS is used for Rel-10 UEs to measure the channel status, especially for multiple antennas cases. PMI/CQI/RI and other feedbacks may be based on the measurement of CSI-RS for Rel-10 and beyond UE, wherein PMI is the precoding matrix indicator, CQI is channel quality indicator, and RI is rank indicator of the precoding matrix. CSI-RS in Rel-10 can support up to 8 transmission antennas while CRS can only support maximal 4 transmission antennas in Rel-8/9. The number of CSI-RS antenna ports can be 1, 2, 4, and 8. In addition, to support the same number of antenna ports, CSI-RS has much less overhead due to its low density in time and frequency.

Generally speaking, in OFDM (Orthogonal Frequency Division Multiplex) system, the frequency bandwidth is divided into multiple subcarriers in frequency domain. In time domain, one subframe is divided into multiple OFDM symbols. The OFDM symbol may have cyclic prefix to avoid the inter-symbol interference due to multiple path delay. One resource element is defined by the time-frequency resource within one subcarrier and one OFDM symbol. Reference signal and other signal such as data channel PDSCH, control channel PDCCH are orthogonal and multiplexed in different resource elements in time-frequency domain.

In OFDM system, signals are modulated and mapped into resource elements, after inverse Fourier transform per each OFDM symbol, the signals in frequency domain is transformed into the signals in time domain, and is transmitted with added cyclic prefix to avoid the inter-symbol interference.

A CSI-RS pattern is signaled to UE by RRC (radio resource control) signaling to support up to 8 transmission antennas. The CSI-RS pattern is cell-specific and hence common for all the Rel-10 UE, and it is repeated periodically with a duty cycle and a subframe offset.

To reduce the interference from and to CSI-RS of neighbor cells, muting of certain resource elements is performed in the PDSCH transmission. In other words, the PDSCH transmission transmits nothing (e.g., a zero power transmissions) in the muted resource elements indicated by a muting pattern. There is signaling to inform Rel-10 UE of the muting pattern. Hence Rel-10 UE discards the muted resource elements in the reception of PDSCH.

SUMMARY

Example embodiments of the present invention which provide a system and method for measuring channel state information in a communications system.

In an embodiment, a method of performing communications by a network element, e.g., an eNodeB, is provided. The method includes a network element providing a first reference signal configuration and a second reference signal configuration to a UE. The first and second reference signal configurations may be provided by the network element via dedicated signaling, such as a dedicated radio resource control (RRC) signaling. The first and second reference signal configurations may include, for example, scrambling codes, subframe configurations, reference signal patterns, and/or other configuration data.

In another embodiment, another method of performing communications by a UE is provided. The method includes receiving a first reference signal configuration and a second reference signal configuration by the UE. The first and second reference signal configurations may be provided to the UE via dedicated signaling, such as a dedicated radio resource control (RRC) signaling. The first and second reference signal configurations may include, for example, scrambling codes, subframe configurations, reference signal patterns, and/or other configuration data.

In yet another embodiment, a UE that includes a receiver, a transmitter, and a processor is provided. The receiver configured to receive a plurality of reference signal configurations and is coupled to the processor which is configured to process a reference signal received via the receiver in accordance with each of the plurality of reference signal configurations. The transmitter is coupled to the processor and is configured to transmit measurement information regarding the reference signal via the transmitter. The reference signal configurations may be provided to the UE via dedicated signaling, such as a dedicated radio resource control (RRC) signaling. The first and second reference signal configurations may include, for example, scrambling codes, subframe configurations, reference signal patterns, and/or other configuration data.

In yet still another embodiment, a communications controller that includes a receiver, a transmitter, and a processor is provided. The processor is configured to provide a plurality of reference signal configurations. The transmitter is coupled to the processor and is configured to transmit is configured to receive feedback measurements corresponding to the plurality of reference signal configurations. The plurality of reference signal configurations may include, for example, scrambling codes, subframe configurations, reference signal patterns, and/or other configuration data.

BRIEF DESCRIPTION

For a more complete understanding of the present invention, and the advantages thereof, reference is now made to the following descriptions taken in conjunction with the accompanying drawing, in which:

FIG. 1 illustrates an example of a first communications system in accordance with an embodiment;

FIGS. 2a-2d illustrate various resource blocks in accordance with an embodiment;

FIG. 3 illustrates an example of a second communications system in accordance with an embodiment;

DETAILED DESCRIPTION

Figure 4:
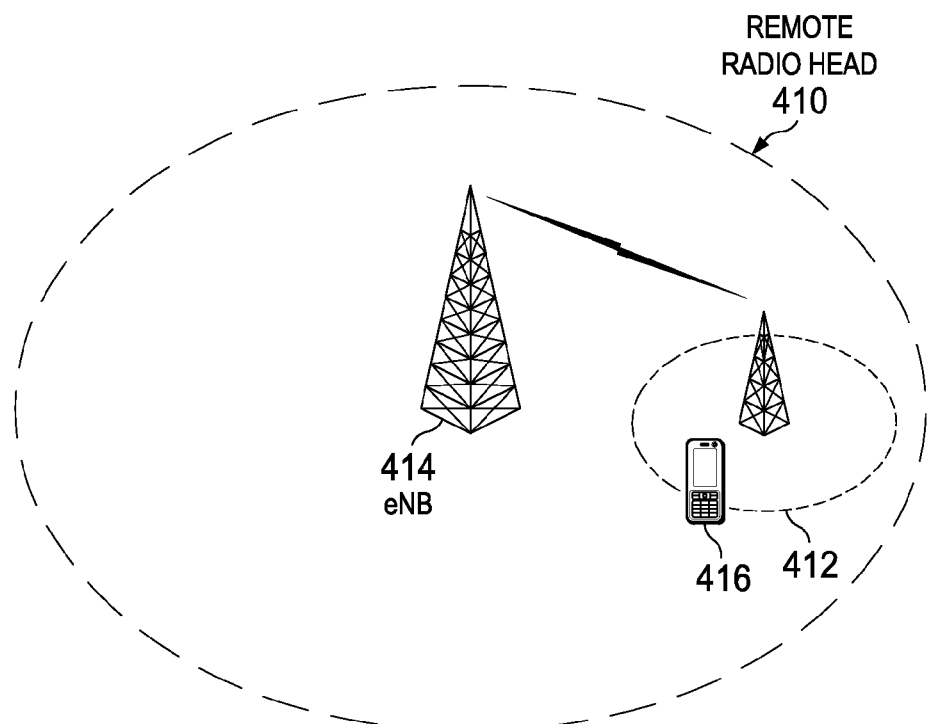
FIG. 4 illustrates an example of a third communications system in accordance with an embodiment.

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to transmitting reference signals for use in measuring a channel. Embodiments will be described with respect to examples in a specific context, namely a Third Generation Partnership Project (3GPP) Long Term Evolution (LTE) compliant communications system that supports the transmission of CSI-RS to assist UEs in measuring channels. The invention may also be applied, however, to other standards compliant, such as IEEE 802.16, WiMAX, and the like, communications systems, as well as non-standards compliant communications systems that make use of reference signals to assist UEs in measuring channels.

Referring now to FIG. 1, there is shown a first communications system 100 in accordance with an embodiment. First communications system 150 includes an enhanced NodeB (eNodeB) 155 and a first User Equipment (UE) 160. While it is understood that communications systems may employ multiple eNodeBs capable of communicating with a number of UEs, only one eNodeB and one UE are illustrated for simplicity. It is also understood that the first communications system 150 may further include numerous other elements, such as relays, gateways, and/or other network elements.

UE 160 may be communications devices that allow an operator to connect to a service, such as voice service, data service, multimedia service, and the like. Communications between eNodeB 155 and UE 160 may occur over uni-directional links. A uni-directional link from eNodeB 155 to UE 160 is referred to as a downlink (DL) 165 and a uni-direction link from UE 160 to eNodeB 155 is referred to as an uplink (UL) 170.

Generally, to improve the performance of the first communications system 150, UE 160 may measure DL 165 and provide CSI related to DL 165 to eNodeB 155. Similarly, eNodeB 155 may measure UL 170 and provide CSI related to UL 170 to UE 160.

In an embodiment, the eNodeB 155 provides reference signal configuration information to UE 160 regarding the use of a reference signal, such as the CSI-RS, for feedback measurements such as CQI/PMI/RI measurement and/or RLM/RRM (Radio Link Monitor/Radio Resource Management) measurement. The use of CSI-RS for CQI/PMI/RI measurement and/or RLM/RRM may be provided as a parameter in the reference signal configuration. In Release-10, CSI-RS is only used for CQI/PMI/RI measurement and CRS is used for RLM/RRM measurement.

The CSI-RS may be included as one or more resource elements of one or more resource blocks. As will be discussed in greater detail below, embodiments discussed herein provide support for a plurality of antenna ports, including more than 8 antenna ports whereas the mechanisms defined by LTE Rel-10 support a maximum of 8 antenna ports. Thus, embodiments discussed herein may allow additional antenna ports (and antennas) within a cell or other geographical region, thereby providing support for more throughputs within a cell or other geographical region.

It should be noted that the number of transmission antenna ports may not be the same as the number of physical antennas. A transmission antenna port can be a virtual transmission antenna, which may be a combination of multiple physical transmission antennas. The transmitted signal on a virtual transmission antenna is generated by applying a precoding vector to the transmitted signals of multiple physical transmission antennas. Antenna port is a concept to indicate the virtual antenna and may correspond to the reference signal transmitted on the corresponding virtual antenna. For example, an antenna port may correspond to the CSI-RS transmitted in by that specific antenna port.

In an embodiment, each UE may receive one or more reference signal configurations, wherein each reference signal configuration may include one or more of a reference signal antenna port configuration, a reference signal pattern configuration, a subframe configuration, a feedback configuration, and a muting configuration. For purposes of illustration, the following description assumes use of the CSI-RS as the reference signal.

The CSI-RS antenna port configuration and/or the CSI-RS pattern configuration information may be UE specific in that the UEs within a cell may utilize different CSI-RS antenna port configurations and/or different CSI-RS pattern configuration. However, while UEs within the same cell may utilize different CSI-RS antenna port configurations and/or different CSI-RS pattern configuration, in some embodiments, one or more, including all, of the UEs may share a common CSI-RS antenna port configuration and/or a common CSI-RS pattern configuration. The eNodeB may provide the CSI-RS antenna port configuration and/or the CSI pattern configuration through physical layer signaling or high layer signaling (e.g., RRC signaling). Physical layer signaling (e.g., L1/L2) may facilitate dynamic switching/updating of the additional CSI-RS ports.

The CSI-RS antenna port configuration information provides the number of ports used for transmission, and may be represented as an integer value, such as 1, 2, 4, 8, or the like and indicates resource block configuration and the size of the CSI-RS patterns within the resource block. The CSI-RS pattern configuration information identifies the pattern to be used to represent the CSI-RS pattern.

Additionally, the eNodeB may provide CSI-RS muting information to the UE. As noted above, muting involves transmitting nothing (e.g., a zero power transmission) for select resource elements to reduce interference to neighboring cells. In an embodiment, the eNodeB provides to the UE configuration information that identifies which resource elements are to be muted. Similar to the CSI-RS antenna port configuration and/or a CSI-RS pattern configuration, the CSI-RS muting information may be specific to each individual UE such that each UE has its own CSI-RS muting information. In another embodiment, one or more of the UE within a cell may share a muting pattern.

In an embodiment, the resource elements which are signaled to a UE as being muted are utilized to transmit additional CSI-RSs. In other words, rather than the muted resource elements having a zero transmit power, the transmit power would be set and the transmit signal would be set representative to the CSI-RS. In this condition, the resource elements which are signaled as being muted are not used for reducing interference to neighbor cells, but are used to support extension of CSI-RS with little or no impact to legacy UEs. This embodiment in which muted resource elements are utilized to transmit additional CSI-RS may provide support for legacy UEs, e.g., Rel-10 UEs, as well as provide support for a greater number of antenna ports for Rel-11 or beyond UEs.

For example, FIG. 2a illustrates a resource block (RB) 200 within the time-frequency domains with possible locations for CSI-RS resource elements (REs) highlighted for a 4 CSI-RS port configuration in accordance with an embodiment. As shown in FIG. 2a, squares representing resource elements that may be used to convey CSI-RS are shown in boxes with similar cross-hatching and numerals 0-3, indicating orientation of the resource elements to form a particular CSI-RS pattern. RB 200 also highlights other resource elements that may be reserved to convey other signals, such as a common reference signal (CRS), demodulation reference signal (DMRS), a physical downlink control channel (PDCCH), a physical downlink shared channel (PDSCH), and the like. In general, the REs that are reserved for the conveyance of the other signals may not be used to convey the CSI-RS.

As discussed above, the eNodeB may signal to each UE that particular time-frequency resources, e.g., resource elements, are to be ignored by that UE, or in other words, the eNodeB may signal that some resource elements are to be muted. For example, FIG. 2b illustrates a muting pattern that the eNodeB may provide to one or more Rel. 10 UEs, wherein the resource elements signaled to be muted is illustrated as having an "X" within the muted resource elements. Thus, in this example, a UE receiving a muting pattern corresponding to FIG. 2b would ignore the CSI-RS patterns corresponding to the $9^{th}$ and $10^{th}$ symbols of the subcarriers 0, 1, 4, 5, 6, 7, 10, and 11.

These resource elements signaled as being muted, however, may be utilized to transmit additional CSI-RS patterns for other UE, such as Rel. 11 and beyond UE. For example, FIG. 2c represents a muting pattern similar to that illustrated in FIG. 2b, except that the $9^{th}$ and $10^{th}$ symbols in subcarriers 4, 5, 10, and 11 are not muted, thus this UE would use these CSI-RS patterns for, e.g., feedback purposes while the UE receiving the muting pattern corresponding to FIG. 2b would not.

FIG. 2d illustrates another configuration in which a completely different muting pattern is provided to different UEs or different groups of UEs within the same cell. As can be seen by comparing FIG. 2b and FIG. 2d, one UE may receive one muting pattern while the other UE may receive a different muting pattern.

It should be noted that the additional CSI-RS is transmitted in resource elements designated as muted to Rel-10 UE, and as a result, the additional CSI-RS will be ignored by the Rel-10 UE. UE capable of supporting embodiments such as those disclosed herein, however, may use the additional CSI-RS to provide support for a greater number of antenna ports if the additional CSI-RS is signaled to the UE.

FIGS. 3 and 4 illustrate examples of network configuration in which the above functionality may be utilized, as well as illustrating a grouping of the CSI-RS. Referring first to FIG. 3, there is illustrated a second example of a communications system in accordance with an embodiment. This example is similar to a Distributed Antenna Systems (DAS) where multiple RRHs (remote radio head) or RRUs (remote radio unit) 310-318 are geometrically separated, but share a single co-located control unit, for example eNodeB 320. Each RRH 310-318 may have multiple physical antennas. In a scenario of DAS with multiple distributed RRHs 310-318 where all the distributed antennas belong to a single cell, and hence there may be more than 8 transmission antennas (and hence more than 8 antenna ports) within one cell.

Further, a single RRH may have a group of antennas, for example 2 antennas. A group of antennas can be assigned to a UE, e.g., UE 322, based on the location of UE. For example, if UE's 322 location is close to RRH 310, then the group of antennas in RRH 310 can be used for data transmission to and from UE 322, and hence, the corresponding group of CSI-RS antenna ports can be assigned to UE 322 for PMI/CQI/RI feedback and measurement.

If UE 322 is close to RRH 310 and 312 as illustrated in FIG. 3, then the antennas of RRH 310 and RRH 312 can be assigned to the UE 322 for data transmission by configuration, hence the corresponding CSI-RS antenna ports need to be assigned to the UE 322 for PMI/CQI/RI feedback and measurement by configuration. In this manner, UE 322 may be configured to utilize a CSI-RS from RRH 310 and RRH 312, whereas UE 324 may be configured to utilize a CSI-RS from RRH 310 and RRH 312, and ignore (via the muting configuration) the other RRHs.

The antenna port configuration signaling from the eNodeB to the UE may further include an indication of groupings of antenna ports to use for, e.g., feedback measurements. In this manner, the feedback measurements may be performed on a per group basis, thereby providing greater insight and flexibility with regard to the network. For example, assume RRH 310 has 2 antenna ports for CSI-RS, and RRH 312 has 2 antenna ports for CSI-RS, thus there are total 4 antenna ports for CSI-RS for the UE 322. The information about which 2 antennas are located each RRH may be useful for the UE 322 to feedback the PMI/CQI/RI, such that the UE 322 may perform feedback of the PMI/CQI/RI from RRH 310 and perform feedback of the PMI/CQI/RI from RRH 312 separately. This provides the eNodeB 320 better information regarding the individual RRHs.

Thus, a reference signal configuration signaling may be sent to inform the UE which antennas are bundled or grouped together for feedback of PMI/CQI/RI, thereby allowing UE 322 to feedback the CQI/PMI/RI measurements per antenna group. For example, the feedback scheme of CQI/PMI/RI corresponding to multiple groups of antennas, where each group of antennas are from a different cell respectively can be used for the CQI/PMI/RI feedback of multiple group of antennas within one cell. Hence the CQI/PMI/RI feedback scheme designed for multiple cells feedback is used directly to the case of multiple groups of antennas within one cell, for example, the multiple RRH scenarios Embodiments such as those described above allow the UEs within a cell to be configured to utilize different reference signals from a different antenna port or a different group of antenna ports.

Referring now to FIG. 4, there is shown an example of another communications system in accordance with an embodiment. In FIG. 4, a macro cell 410 has a larger coverage relative to, but overlaps, a pico-cell 412. The pico-cell 412 may be connected to the eNodeB 414 by high speed link, for example, by fiber. In FIG. 4, a UE, e.g., UE 416 may use both macro-cell 410 and pico-cell 412 for data transmission such as may be the case in coordinated multiple point transmission (CoMP). Macro-cell 410 and pico-cell 412 may have different cell-ids, thus it may be desirable for the UE 416 know which group of antennas belong to macro-cell 410 and which group of antennas are belong to pico-cell 412, as well as the CSI-RS patterns of macro-cell 410 and pico-cell 412. A similar scenario is where multiple RRHs each has separate cell ID, which makes them separate cells from a UE point of view.

As discussed above with reference to FIG. 3, by providing the antenna groupings to the UE, the UE may feedback separate measurements for each group, thereby providing the eNodeB better information regarding the network performance.

Additionally, the Rel-10 UE may use rate matching around the muted resource elements (RE), hence there is no impact to the rel-10 UE if the muted resource elements are used for additional/new transmissions/channels, such as additional CSI-RS transmission.

Figure 5:
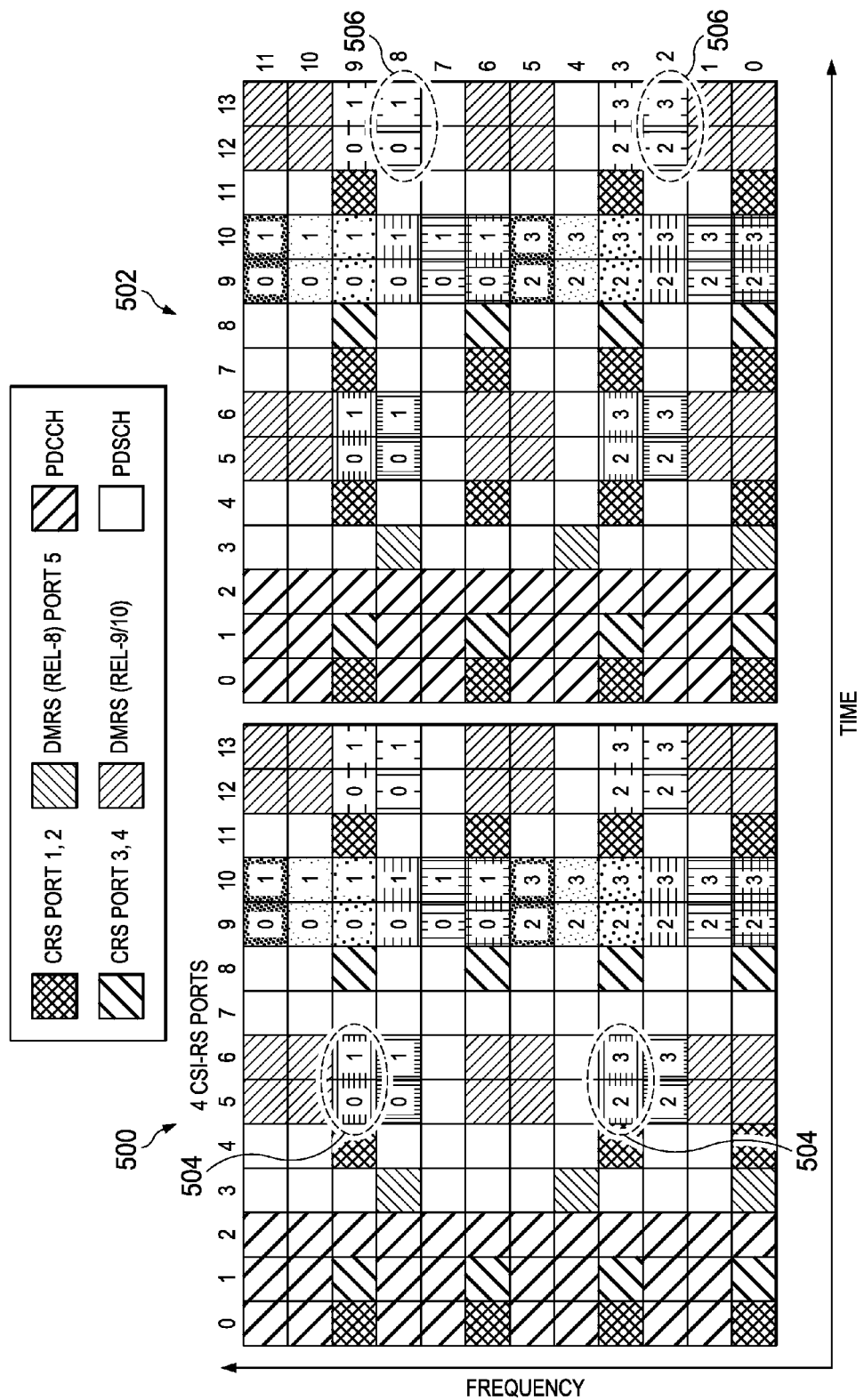
FIG. 5 illustrates the communication of differing CSI-RS patterns in different subframes in accordance with an embodiment.

This solution can also support configuring different additional CSI-RS ports in different subframes for a UE. CSI-RS patterns can be configured differently for different subframes for a UE. The signaling may inform the UE of two sets of CSI-RS antenna ports. For example, FIG. 5 illustrates a first subframe 500 and a second subframe 502, wherein the first subframe 500 represents subframe i (i is an integer) and the second subframe 502 represents subframe j (j is an integer different from i). It should be noted that FIG. 5 illustrates the first and second subframes 500 and 502 as being sequential subframes for illustrative purposes.

In this example, the UE is configured to perform feedback processes on the first subframe 500 utilizing the CSI-RS indicated by the ellipse 504, which may correspond to physical antennas 0-3, and on the second subframe 502 utilizing the CSI-RS indicated by the ellipse 506, which may be physical antennas 4-7. The total CSI-RS resource (overhead) in one subframe may be reduced by this time division multiplexing scheme. Signal transmitted from eNodeB may inform the UE the different configuration of CSI-RS for different subframes.

In an embodiment, the CSI-RS-Config information element, or a similar information element, may be used to transmit similar information, but specific to a UE such that the configuration parameters are UE-specific rather than cell-specific.

Furthermore, with regard to the muting aspect, the CSI-RS-Config information element of LTE Rel-10 also provides a zeroTxPowerCSI-RS component that provides configuration parameters zeroTxPowerResourceConfigList and zeroTxPowerSubframeConfig. In accordance with embodiments herein, these configuration parameters may be used to provide the muting configuration for a specific UE, such that different UE within a cell may be provided different muting configuration parameters by the same eNodeB.

In an embodiment, different CSI-RS patterns may be differentiated by time-frequency resources or orthogonal code in time and/or frequency domain. Generally, a cell-specific pseudo random sequence is modulated for scrambling in a CSI-RS pattern for interference randomization among cells. Within a cell, different CSI-RS patterns may also be differentiated by different scrambling codes. A higher layer signaling, e.g., RRC signaling, may explicitly indicate a scramble code used for scrambling CSI-RS symbols for a CSI-RS pattern. For example, "0" may indicate a first scrambling code, "1" may indicate a second scrambling code, and so forth. The different scrambling codes may be of different initial phases for a common scramble code such as a pseudo random sequence. An example of such sequence is a Gold sequence. The different scrambling codes may be generated based on the cell identifier, UE identifier, CSI-RS pattern identifier, the antenna group identifier, the configured parameter(s), and/or the like. An antenna group may be associated with the antennas of a site such as macro or RRH. The similar design may also be used to generate scrambling code for transmission of DMRS for data demodulation.

In an embodiment, a UE may be configured to measure a plurality of CSI-RS patterns transmitted on different time-frequency resources and/or with different scrambling codes. As such, the UE may be provided with reference signal configuration that includes an indication of the time-frequency resources (e.g., one or more resource elements) and an indication of the scrambling codes that are to be used to transmit the reference signal, e.g., the CSI-RS. When UE is configured to feedback CSI, such as CQI, PMI, RI, and/or the like, the feedback reports are linked to the configured CSI-RS patterns. In an embodiment, a feedback may be linked to one of the configured CSI-RS patterns. Multiple feedback measurements may be configured simultaneously. In another embodiment, a feedback may be linked to several of the configured CSI-RS patterns. In yet another embodiment, a feedback may be linked to all the configured CSI-RS patterns. The feedbacks may be of different periodicities or to be aperiodic and triggered by signaling.

In an embodiment, the CSI-RS-Config information element of LTE Rel-10 may be modified to incorporate embodiments such as those discussed herein. For example, the CSI-RS-Config information element of LTE Rel-10 provides, among others, a setup component that provides configuration parameters antennaPortsCount, resourceConfig, and subframeConfing to the UE within a cell, but only support a single value within a cell. In an embodiment, a modification is made to support multiple CSI-RS Config information.

In an embodiment, the multiple muting configurations may be provided to a UE, thereby indicating groupings of antenna ports of CSI-RS signals. Other embodiments, however, may utilize other mechanisms to provide multiple reference signal configurations to a UE, as well as providing different UEs within a cell with different reference signal configurations. For example, the eNodeB (or other network element) may provide the configuration information identifying the antenna ports, groupings, scrambling codes, subframe configurations, etc. to the UE.

In an embodiment in which multiple reference signal configurations are provided to a UE, missing parameters may default to parameters provided in a preceding reference signal configuration. For example, as discussed above the reference signal configuration may include a subframe configuration parameter. Once received by the UE, the subframe configuration parameter may be optional such that subsequent reference signal configurations may omit the subframe configuration parameter, in which case the subframe configuration parameter from the previous reference signal configuration may be used.

Figure 6:
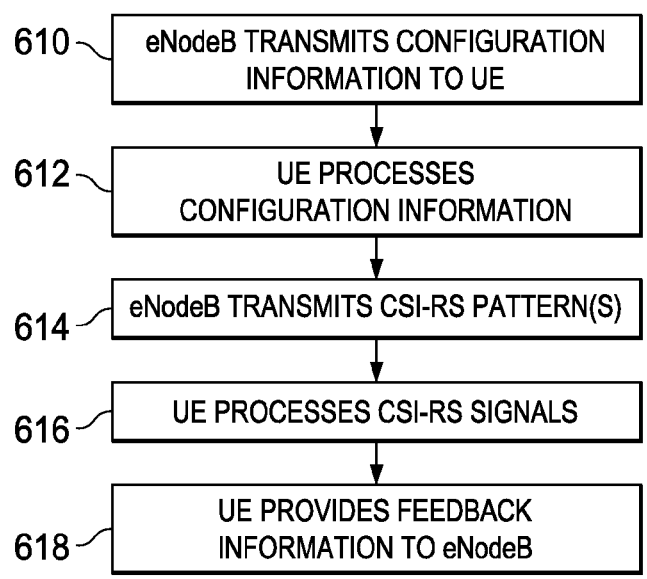
FIG. 6 is a process flow diagram illustrating an example of a process of performing CSI-RS measurements in accordance with an embodiment.

FIG. 6 illustrates a method for utilizing CSI-RS information for feedback measurements, such as PMI/CQI/RI and/or RLM/RRM feedback measurements, in accordance with an embodiment. As discussed above, a single cell may have multiple antenna sites, e.g., RRHs. Hence, in accordance with an embodiment such as those discussed above, the eNodeB provides grouping information to the UE such that the UE may perform separate feedback measurements for each group.

The process begins in step 610, wherein the eNodeB transmits the CSI-RS configuration information to the UE. In this embodiment, the CSI-RS configuration information is specific to the UE, although multiple UE may have the same CSI-RS configuration information. It should be noted that in the embodiment illustrated in FIG. 6, the eNodeB transmits legacy CSI-RS information as well as improved CSI-RS information. The CSI-RS configuration information may comprise, for example, the antenna port configuration information, resource element muting configuration information, antenna port groupings configuration information, scrambling code configuration information, and/or the like as discussed above.

Next, in step 612, the UE processes the configuration information. Thereafter, in step 614, the eNodeB transmits the CSI-RS patterns according to the configuration information and, optionally, legacy specifications such as Rel-10. By transmitting both the UE-specific CSI-RS patterns (described herein) as well as the CSI-RS patterns of legacy systems. The CSI-RS patterns comprise the CSI-RS patterns transmitted in, e.g., resource blocks as provided for by LTE systems.

In step 616, the UE processes the corresponding signals, and in step 618, the UE provides the measurements back to the eNodeB.

As noted above, the process described above may be used to perform, for example, CQI/PMI/RI feedback measurements and/or RLM/RRM feedback measurements. It should be noted that in an embodiment, the antenna ports used for CQI/PMI/RI feedback measurements may be different than the antenna ports used for RLM/RRM feedback measurements. The higher layer signaling (for example, dedicated or broadcast RRC signaling) can inform UE which antenna or group of antennas or groups of antennas are for RLM/RRM measurement and can inform UE which antenna ports are within one group for RLM/RRM measurement and/or report. Further, the eNodeB may determine which antenna ports are to be used for the CQI/PMI/RI feedback measurement based upon the RLM/RRM feedback measurements.

An antenna port of CSI-RS of legacy systems, e.g., Rel-10, may be the same or different than one of antenna ports of new CSI-RS of using embodiments discussed herein. For example, an antenna port of legacy CSI-RS can be the virtual transmission antenna port by applying the small delay (less than length of CP) cyclic delay diversity to multiple antennas in one site. An additional CSI-RS antenna port can be just a physical antenna port. Or an antenna port of CSI-RS of legacy system may be just one antenna port of new CSI-RS of using embodiments discussed herein.

Figure 7:
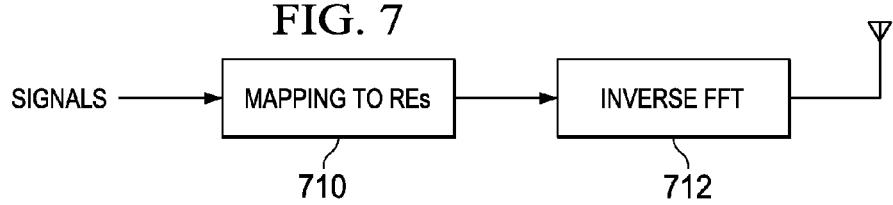
FIG. 7 is a process flow diagram illustrating an example of a transmission method in accordance with an embodiment.

FIG. 7 illustrates a transmission method in accordance with an embodiment. As indicated in step 710, additional one or more CSI-RS signals and/or other channel signals are mapped into corresponding resource elements. The signals in resource elements are transformed into a signal in the time domain in step 712. In an embodiment, an inverse FFT (Fast Fourier Transform) is used to transform each OFDM symbol, a signal in frequency domain, into a signal in time domain. Thereafter, the signal in the time domain is transmitted.

As noted above, to avoid the interference of CSI-RS to other channels within the same cell, eNodeB may utilize the muting configuration information to signal the muted pattern to UE. Additional CSI-RS may be mapped into the muted resource elements being signaled to UE since reference signal and data channel are usually orthogonal in time-frequency domain in OFDM system. At the UE side, UE, including legacy UE such as Rel-10 UE, assumes the muted UE is not for PDSCH transmission, hence there is no interference of CSI-RS to PDSCH within the same cell. Likewise, as discussed above, the eNodeB provides the CSI-RS configuration information to UE for UE to perform measurement and to decode the PDSCH.

Figure 8:
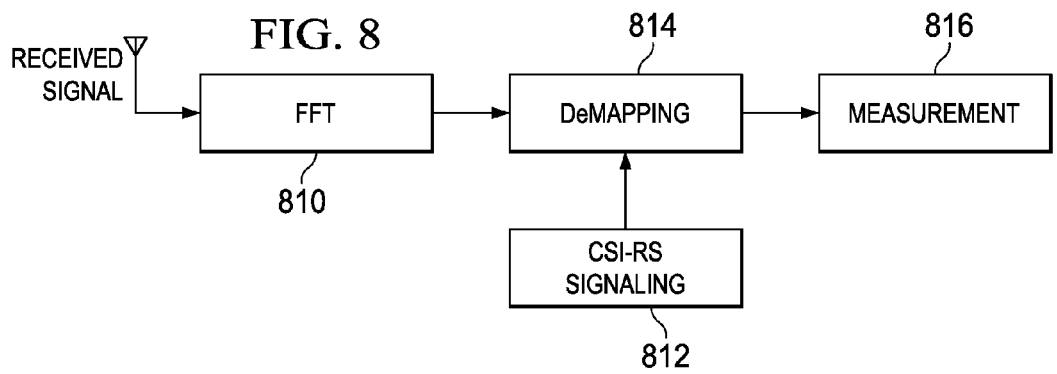
FIG. 8 is a process flow diagram illustrating an example of a reception method in accordance with an embodiment.

FIG. 8 illustrates a reception method in accordance with an embodiment. At the UE side, the received signal is transformed by FFT as indicated by step 810, thereby transforming the received signal in the time domain into a frequency domain signal per OFDM symbol. The UE may decode, step 812, the signaling from eNodeB to know the additional CSI-RS and/or legacy CSI-RS, use that information for demapping, step 814, to perform CSI-RS signal measurements, step 816. This CSI-RS signal may be used for, e.g., channel estimation and measurement.

In another embodiment of multiple CSI-RS configurations, in addition to a first set of CSI-RS ports, such as the legacy CSI-RS in LTE Rel-10, or a first set of CSI-RS ports in Rel-11 and beyond system, a second set of CSI-RS ports can be informed to UE by dedicated signaling, such as dedicated RRC signaling.

The signal of the second set of CSI-RS ports may or may not be transmitted in resource elements signaled as being muted. For example, if a subframe with the signal of the second set of CSI-RS ports is never allocated to other UEs not aware of the existence of the second set of the CSI-RS ports, resource elements for CSI-RS transmission in the subframe may not be signaled as being muted for interference avoidance.

The first set of CSI-RS may be cell-specific, but may also be signaled by UE dedicate signaling. However, with broadcast signaling to indicate cell-specific CSI-RS, the overhead is reduced. With UE dedicate signaling, a UE-specific CSI-RS configuration can be allocated for the first set of CSI-RS ports.

In another embodiment, the second CSI-RS signaling may comprise the same parameters, but with potentially different values, as the first signaling. For example, the parameters "CSI reference signal duty cycle and offset" and/or "CSI reference signal configuration" from 36.331 may be dedicated rather than cell-specific. In another embodiment, only some of the parameters are transmitted for the second CSI-RS signaling, and the other not transmitted parameters are the same as in the first CSI-RS signaling. This could save overhead. For example, second CSI-RS signaling may include or override or update a subset of the parameters, such as pattern, and may leave others, such as period/offset the same. In another embodiment, all of the parameters are transmitted, but some restrictions may be enforced. For example, the period may be set the same but the offset changed. The UE may not expect to see a restricted configuration, such as when a collision of CSI-RS occurs. In other words, a UE may not have special handling of collided patterns. In another embodiment, if the second configuration fully collides, then the second is used. In another embodiment, if there is a partial collision, only the part that collides is overridden by the second CSI-RS signaling.

In another embodiment, the second CSI-RS signaling may indicate additional CSI-RS patterns for the UE so that the UE may measure and feedback for additional antenna ports. In yet another embodiment, CSI-RS signaling may be used to remove some of the configured CSI-RS pattern(s) and/or antenna groups.

The first set of CSI-RS ports may be a larger set of CSI-RS for determining a subset of CSI-RS for CQI report. For example, the first CSI-RS may have 8 antenna ports, 4 antenna port of the first CSI are signaled by the second CSI-RS signaling for UE to feed back the CQI report since total 8 antenna ports may be too many for CQI report. But the first CSI-RS can be measured for selecting which part of antenna ports are used for a UE to feed back CQI report. In this case, the second set of CSI-RS is used for CQI report, but the first set of CSI-RS is still useful, which is for selection of antenna ports for CQI report. In other words, the first set of CSI-RS ports may be used for RLM/RRM measurement.

The second CSI-RS signaling may not be necessary for every UE. For a UE does not receive the second signaling, the UE just uses the first set of CSI-RS ports for CQI feedback by default. During reconfiguration of CSI-RS patterns, the first CSI-RS signaling (or the cell-specific signaling) serves also as the default configuration.

A signaling for CSI-RS may indicate which antenna ports are of the same group, for example, which antenna ports are of a same configured CSI-RS pattern. There may be multiple patterns being signaled to UE for measurements and/or CQI feedback.

Figure 9:
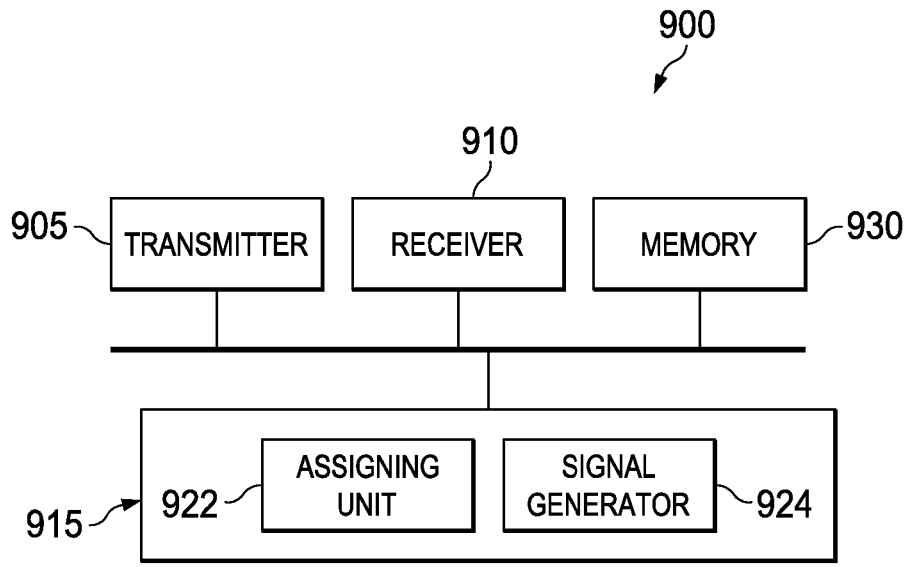
FIG. 9 is a block diagram of an example of a eNodeB in accordance with an embodiment.

Referring now to FIG. 9, there is shown a block diagram of an example communications controller 900. Communications controller 900 may be an implementation of an eNB, a low power cell, and the like, of a communications system. Communications controller 900 may be used to implement various ones of the embodiments discussed herein. As shown in FIG. 9, a transmitter 905 is configured to send control channels, messages, information, and the like, and a receiver 910 is configured to receive messages, information, and the like. Transmitter 905 and receiver 910 may have a wireless interface, a wireline interface, or a combination thereof.

An assigning unit 922 is configured to assign CSI-RS to different time instances for transmission to avoid collisions with the special signals. A signal generator 924 is configured to generate signals to be transmitted by transmitter 905. A memory 930 is configured to store the CSI-RS assignments, information about the special signals, and the like.

The elements of communications controller 900 may be implemented as specific hardware logic blocks. In an alternative, the elements of communications controller 900 may be implemented as software executing in a processor, controller, application specific integrated circuit, and the like. In yet another alternative, the elements of communications controller 900 may be implemented as a combination of software and/or hardware.

As an example, transmitter 905 and receiver 910 may be implemented as a specific hardware block, while assigning unit 922 and signal generator 924 may be software modules executing in a processor 915, such as a microprocessor, a digital signal processor, a custom circuit, or a custom compiled logic array of a field programmable logic array.

Figure 10:
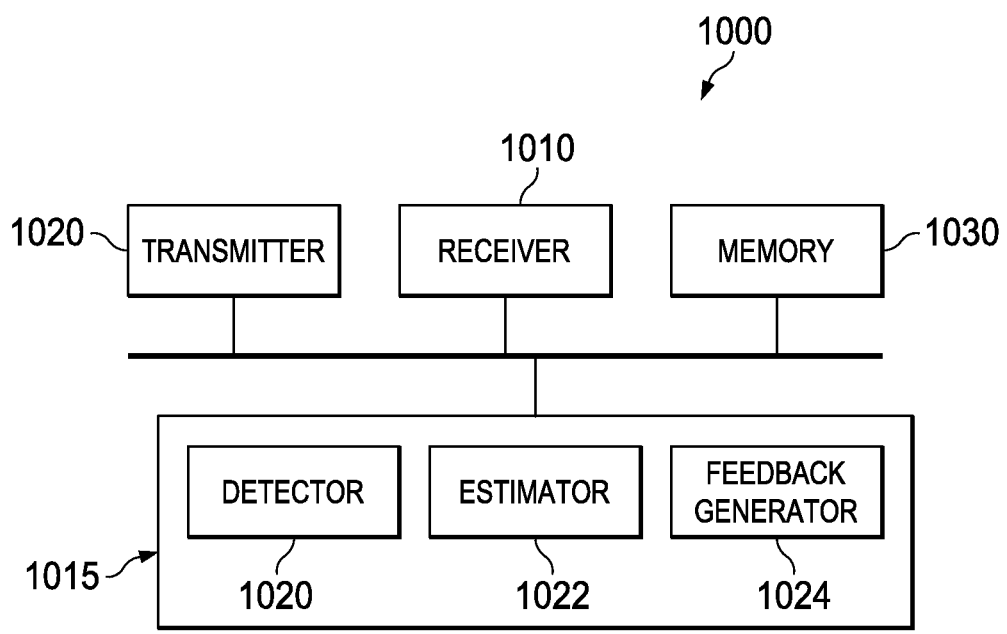
FIG. 10 is a block diagram of an example of a UE in accordance with an embodiment.

FIG. 10 illustrates a diagram of a communications device 1000. Communications device 1000 may be an implementation of a UE, and the like, of a communications system. Communications device 1000 may be used to implement various ones of the embodiments discussed herein. As shown in FIG. 10, a transmitter 1005 is configured to send control channels, messages, information, and the like, and a receiver 1010 is configured to receive messages, information, and the like. Transmitter 1005 and receiver 1010 may have a wireless interface, a wireline interface, or a combination thereof.

A detector 1020 is configured to detect transmissions, such as subband CSI-RS at specified frequency resource(s) and time resource(s). As an example, detector 1020 may perform detection at the specified frequency resource(s) and time resource(s) to find signals transmitted to communications device 1000. An estimator 1022 is configured to estimate a communications channel between communications device 1000 and a communications controller serving communications device 1000 based on signals, such as CSI-RS, transmitted by the communications controller. Estimator 1022 may make use of a plurality of subband signals transmitted by the communications controller to estimate the channel. A feedback generator 1024 is configured to generate channel information from the estimate of the channel produced by estimator 1022, where the channel information is to be fed-back to the communications controller. A memory 1030 is configured to store detected signals, channel estimates, channel information, and the like.

The elements of communications device 1000 may be implemented as specific hardware logic blocks. In an alternative, the elements of communications device 1000 may be implemented as software executing in a processor, controller, application specific integrated circuit, and the like. In yet another alternative, the elements of communications device 1000 may be implemented as a combination of software and/or hardware.

As an example, transmitter 1005 and receiver 1010 may be implemented as a specific hardware block, while detector 1020, estimator 1022, and feedback generator 1024 may be software modules executing in a processor 1015, such as a microprocessor, a digital signal processor, a custom circuit, or a custom compiled logic array of a field programmable logic array.

In Rel-10, only one CSI-RS configuration (for example, antenna ports pattern, duty cycle and offset) may be informed to a UE, and the scrambling code for CSI-RS is cell-specific. RRM measurement and RLM measurement are based on CRS. Furthermore, the signaling of CSI-RS in Rel-10 is not flexible enough to support more scenarios, such as multiple sites with a single share cell-id, where each site has a group of antennas.

Embodiments such as those discussed above, the CSI-RS signaling supports RRM/RLM measurement for UE, hence it can support UE mobility in scenario 4 of 3GPP CoMP study item (multiple sites with a single shared cell-id). CSI-RS signaling in embodiments such as those discussed above may also support flexible configuration of CSI-RS, so UE may have different virtual antennas in different subframes, to support resource-specific measurement. Additionally, embodiments such as those discussed above may support CSI-RS utilizing different scrambling codes, hence the CSI-RS of neighbor cells can be informed to the UE directly without need that the UE knows the neighbor cells.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a nonvolatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of performing communications, the method comprising:
   providing, by a network element, a first reference signal configuration corresponding to one or more first user equipments (UEs), wherein the first reference signal configuration comprises a first Channel Status Indication-Reference Signal (CSI-RS) configuration;
   providing, by the network element, a second reference signal configuration corresponding to the one or more first UEs, wherein the second reference signal configuration comprises a second CSI-RS configuration different from the first CSI-RS configuration,
      wherein the first reference signal configuration comprises an indication of a first scrambling code and an indication of a first time-frequency resource to the one or more first UEs, wherein the second reference signal configuration comprises an indication of a second scrambling code and an indication of a second time-frequency resource to the one or more first UEs, wherein the first scrambling code is different than the second scrambling code, and wherein the first time-frequency resource is different than the second time-frequency resource;
   transmitting, by an antenna of the network element using dedicated signaling, the first reference signal configuration to the one or more first UEs; and
   transmitting, by the antenna of the network element using dedicated signaling, the second reference signal configuration to the one or more first UEs, wherein the first CSI-RS configuration and the second CSI-RS configuration are different from another CSI-RS configuration transmitted by the antenna of the network element to another UE.

2. The method of claim 1, wherein the transmitting the first reference signal configuration and the transmitting the second reference signal configuration are performed at least in part using dedicated radio resource control (RRC) signaling.

3. The method of claim 1, wherein the first reference signal configuration comprises the first scrambling code and the second reference signal configuration comprises the second scrambling code.

4. The method of claim 1, further comprising transmitting by the network element an indication of whether a corresponding CSI-RS is to be used for Precoding Matrix Indicator/Channel Quality Indicator/Rank Indicator (PMI/CQI/RI) measurement, Radio Link Monitor/Radio Resource Management (RLM/RRM) measurement, or both PMI/CQI/RI measurement and RLM/RRM measurement.

5. The method of claim 1, further comprising receiving feedback information for Precoding Matrix Indicator/Channel Quality Indicator/Rank Indicator (PMI/CQI/RI) based upon transmitted one or more CSI-RS patterns.

6. The method of claim 1, further comprising receiving feedback information for Radio Link Monitor/Radio Resource Management (RLM/RRM) based upon transmitted CSI-RS patterns.

7. The method of claim 1, wherein the first reference signal configuration comprises a subframe configuration and the second reference signal configuration omits a subframe configuration.

8. The method of claim 1, wherein the first reference signal configuration comprises a first subframe configuration and the second reference signal configuration comprises a second subframe configuration, the first subframe configuration being different from the second subframe configuration.

9. A method of performing communications, the method comprising:
   receiving, by a user equipment (UE) from an antenna of a communications controller, a first reference signal configuration using dedicated signaling, wherein the first reference signal configuration comprises a first Channel Status Indication-Reference Signal (CSI-RS) configuration for a subframe; and
   receiving, by the UE from the antenna of the communications controller, a second reference signal configuration using dedicated signaling, wherein the second reference signal configuration comprises a second CSI-RS configuration for the subframe that is different than the first CSI-RS configuration for the subframe,
   wherein the first reference signal configuration comprises an indication of a first scrambling code and an indication of a first time-frequency resource, wherein the second reference signal configuration comprises an indication of a second scrambling code and an indication of a second time-frequency resource, wherein the first scrambling code is different than the second scrambling code, wherein the first time-frequency resource is different than the second time-frequency resource, and wherein the first CSI-RS configuration and the second CSI-RS configuration for the subframe are different from another CSI-RS configuration for the subframe received by another UE from the antenna of the communications controller.

10. The method of claim 9, wherein the first reference signal configuration and the second reference signal configuration are received using dedicated radio resource control (RRC) signaling.

11. The method of claim 9, wherein the first reference signal configuration comprises the first scrambling code and the second reference signal configuration comprises the second scrambling code.

12. The method of claim 9, wherein the first reference signal configuration comprises an indication of whether a corresponding CSI-RS is to be used for Precoding Matrix Indicator/Channel Quality Indicator/Rank Indicator (PMI/CQI/RI) measurement, Radio Link Monitor/Radio Resource Management (RLM/RRM) measurement, or both PMI/CQI/RI measurement and RLM/RRM measurement.

13. The method of claim 9, further comprising transmitting feedback information for Precoding Matrix Indicator/Channel Quality Indicator/Rank Indicator (PMI/CQI/RI) based upon CSI-RS patterns.

14. The method of claim 9, wherein the first reference signal configuration comprise a first subframe configuration and the second reference signal configuration comprise a second subframe configuration, the first subframe configuration being different than the second subframe configuration.

15. The method of claim 9, wherein the first reference signal configuration comprises a subframe configuration and the second reference signal configuration omits a subframe configuration.

16. A user equipment comprising:
- a receiver configured to receive a plurality of reference signal configurations from an antenna of one communications controller using dedicated signaling, wherein each reference signal configuration comprises a Channel Status Indication-Reference Signal (CSI-RS) configuration, wherein at least two of the CSI-RS configurations are different from each other,
  - wherein a first one or more of the plurality of reference signal configurations comprise an indication of a first scrambling code and an indication of a first time-frequency resource, wherein a second one or more of the plurality of reference signal configurations comprise an indication of a second scrambling code and an indication of a second time-frequency resource to the UE, wherein the first scrambling code is different than the second scrambling code, wherein the first time-frequency resource is different than the second time-frequency resource, and wherein the at least two of the CSI-RS configurations are different from another CSI-RS configuration received by another user equipment from the antenna of the one communications controller;
- a processor coupled to the receiver, the processor configured to process a reference signal received via the receiver in accordance with each of the plurality of reference signal configurations; and
- a transmitter coupled to the processor, the transmitter configured to transmit measurement information regarding the reference signal via the transmitter.

17. The user equipment of claim 16, wherein the plurality of reference signal configurations are received using dedicated radio resource control (RRC) signaling.

18. The user equipment of claim 16, wherein the reference signal comprises a CSI-RS.

19. The user equipment of claim 16, wherein the first one or more of the plurality of reference signal configurations comprise the first scrambling code and the second one or more of the plurality of reference signal configurations comprise the second scrambling code.

20. The user equipment of claim 16, wherein the plurality of reference signal configurations comprises an indication of whether a corresponding CSI-RS is to be used for Precoding Matrix Indicator/Channel Quality Indicator/Rank Indicator (PMI/CQI/RI) measurement, Radio Link Monitor/Radio Resource Management (RLM/RRM) measurement, or both PMI/CQI/RI measurement and RLM/RRM measurement.

21. The user equipment of claim 16, wherein the first one or more of the plurality of reference signal configurations comprise a first subframe configuration, and wherein the second one or more of the plurality of reference signal configurations comprise a second subframe configuration, the first subframe configuration being different than the second subframe configuration.

22. A communications controller comprising:
- a processor configured to provide a plurality of reference signal configurations to a user equipment (UE), wherein each reference signal configuration comprises a Channel Status Indication-Reference Signal (CSI-RS) configuration, wherein at least two of the CSI-RS configurations are different from each other,
  - wherein a first one or more of the plurality of reference signal configurations comprise an indication of a first scrambling code and an indication of a first time-frequency resource, wherein a second one or more of the plurality of reference signal configurations comprise an indication of a second scrambling code and an indication of a second time-frequency resource to the UE, wherein the first scrambling code is different than the second scrambling code, and wherein the first time-frequency resource is different than the second time-frequency resource;
- a transmitter coupled to the processor, the transmitter configured to transmit via an antenna to the UE the plurality of reference signal configurations using dedicated signaling, wherein the at least two of the CSI-RS configurations are different from another CSI-RS configuration transmitted by the transmitter via the antenna to another UE; and
- a receiver coupled to the processor, the receiver configured to receive feedback measurements corresponding to the plurality of reference signal configurations.

23. The communications controller of claim 22, wherein the transmitter is configured to transmit the plurality of reference signal configurations using dedicated radio resource control (RRC) signaling.

24. The communications controller of claim 22, wherein the first one or more of the plurality of reference signal configurations comprise the first scrambling code, and wherein the second one or more of the plurality of reference signal configurations comprise the second scrambling code.

25. The communications controller of claim 22, wherein one or more of the plurality of reference signal configurations comprise an indication of whether a corresponding CSI-RS is to be used for Precoding Matrix Indicator/Channel Quality Indicator/Rank Indicator (PMI/CQI/RI) measurement, Radio Link Monitor/Radio Resource Management (RLM/RRM) measurement, or both PMI/CQI/RI measurement and RLM/RRM measurement.

26. The communications controller of claim 22, wherein the first one or more of the plurality of reference signal configurations comprise a subframe configuration, and wherein the second one or more of the plurality of reference signal configurations omit a subframe configuration.

27. The communications controller of claim 22, wherein the first one or more of the plurality of reference signal configurations comprise a first subframe configuration, and wherein the second one or more of the plurality of reference signal configurations comprise a second subframe configuration, the first subframe configuration being different than the second subframe configuration.

28. A method of performing communications, the method comprising:
- providing by a network element a first reference signal configuration corresponding to one or more first user equipments (UEs), wherein the first reference signal configuration comprises a first Channel Status Indication-Reference Signal (CSI-RS) configuration;
- providing by the network element a second reference signal configuration corresponding to the one or more first UEs, wherein the second reference signal configuration comprises a second CSI-RS configuration different from the first CSI-RS configuration,
  - wherein the reference signal configurations comprise signaling to indicate antenna ports of the CSI-RS configurations that are within a same group of a location;
- transmitting by an antenna of the network element using dedicated signaling the first reference signal configuration to the one or more first UEs; and
- transmitting by the antenna of the network element using dedicated signaling the second reference signal configuration to the one or more first UEs, wherein the first CSI-RS configuration and the second CSI-RS configuration are different from another CSI-RS configuration transmitted by the antenna of the network element to another UE.

29. A method of performing communications, the method comprising:
providing by a network element a first reference signal configuration corresponding to one or more first user equipments (UEs), wherein the first reference signal configuration comprises a first Channel Status Indication-Reference Signal (CSI-RS) configuration;
providing by the network element a second reference signal configuration corresponding to the one or more first UEs, wherein the second reference signal configuration comprises a second CSI-RS configuration different from the first CSI-RS configuration,
wherein the first CSI-RS configuration is a legacy CSI-RS configuration, wherein the second CSI-RS configuration is an RS configuration of which resource elements are mutable by a legacy UE muting signaling, and wherein the second CSI-RS configuration contains CSI-RS information;
transmitting by an antenna of the network element using dedicated signaling the first reference signal configuration to the one or more first UEs; and
transmitting by the antenna of the network element using dedicated signaling the second reference signal configuration to the one or more first UEs, wherein the first CSI-RS configuration and the second CSI-RS configuration are different from another CSI-RS configuration transmitted by the antenna of the network element to another UE.

* * * * *